United States Patent [19]

Login

[11] 4,080,315
[45] Mar. 21, 1978

[54] POLYESTERS OF N,N-BIS(HYDROXYALKYL) TAURINE SALTS AS ANTISTATIC AGENTS FOR SYNTHETIC POLYMERS

[75] Inventor: Robert Bernard Login, Woodhaven, Mich.

[73] Assignee: BASF Wyandotte Corporation, Wyandotte, Mich.

[21] Appl. No.: 739,497

[22] Filed: Nov. 8, 1976

[51] Int. Cl.$^2$ .................... C08G 63/20; C08G 63/68
[52] U.S. Cl. ................. 260/75 N; 260/78 R; 260/78 L; 260/75 S; 260/513 N; 526/3
[58] Field of Search ........................... 260/75 N, 75 S

[56] References Cited

U.S. PATENT DOCUMENTS

| 3,673,158 | 6/1972 | Reader et al. | 260/75 N |
| 3,817,934 | 6/1974 | Hahn et al. | 260/75 N |
| 3,856,753 | 12/1974 | Henry et al. | 260/75 N |
| 3,872,183 | 3/1975 | Keck | 260/75 N X |

Primary Examiner—Lucille M. Phynes
Attorney, Agent, or Firm—Andrew E. Pierce; Bernhard R. Swick; Robert E. Dunn

[57] ABSTRACT

Shaped objects including synthetic polymeric fibers with improved antistatic properties are prepared by incorporation therein about 1 to about 15% of a polyester antistatic agent prepared by reacting an N,N-bis(hydroxyalkyl) taurine salt with an organic polycarboxylic acid. Incorporation of the polyester into a synthetic polymer is accomplished by the process of preparing a melt or solution of the synthetic polymer and the polyester and extruding from the melt or casting from the solution to provide films, fibers and other molded objects exhibiting antistatic properties. A process for the preparation of the polyester antistatic agents of the invention, and for the preparation of the N,N-bis(hydroxyalkyl) taurine salts is also disclosed.

11 Claims, No Drawings

POLYESTERS OF N,N-BIS(HYDROXYALKYL) TAURINE SALTS AS ANTISTATIC AGENTS FOR SYNTHETIC POLYMERS

BACKGROUND OF THE INVENTION

1. Field of the Invention

This invention relates to man-made fibers and other molded objects prepared from synthetic polymers having durable antistatic properties.

2. Description of the Prior Art

Generally, antistatic synthetic fibers, in the form of continuous filament or spun yarns are obtained by first melt-spinning a linear fiber-forming synthetic polymer in combination with an antistatic agent. It has often been suggested that antistatic polymer fibers, such as polyamide fibers, can be produced by melt-spinning a mixture of the fiber-forming polymer with such antistatic agents as polyalkylene oxides of their reaction products. For instance, suitable tetrol compounds can be chain extended for use as antistatic additives as described in U.S. Pat. No. 2,979,528.

It is known from the teachings of U.S. Pat. No. 3,147,301 that organic polymers can be modified to impart a slightly ionic or hydrophilic character thereto and to improve the dyeability and antistatic properties of the polymer by the use of sulfo-organic esters of fumaric and maleic acids. Such esters contain the salt of a sulfonic acid. In U.S. Pat. No. 3,894,077 there is disclosed a nitrogen containing antistatic agent for a plastic comprising a compound of the formula

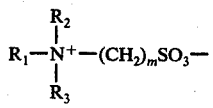

wherein $R_1$ is a hydroxyalkyl group of the formula

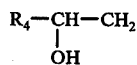

in which $R_4$ is an alkyl group having 6 to 16 carbon atoms, $R_2$ is a lower alkyl group having 1 to 4 carbon atoms or hydroxyalkyl group of the same kind as $R_1$, $R_3$ is a lower alkyl group having 1 to 4 carbon atoms and $m$ is an integer of 1 to 4. Partly because such antistatic agents for plastics are not polymeric, these compounds are not permanent and tend to be removed by exposure to washing or drycleaning solvents.

The antistatic agent compounds utilized as reactants herein are disclosed in U.S. Pat. No. 2,830,082. These compounds are N-(hydroxyalkyl) taurine compounds having the following structure:

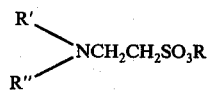

wherein R is a member of the group consisting of hydrogen and alkali metals, R' is a member of the group consisting of hydrogen, the methyl radical and hydroxyalkyl radicals containing from 2 to 4 carbon atoms. These compounds also lack permanence to washing and drycleaning of the antistatic effect when they are incorporated in a textile fabric. Because they are derived from taurines these compounds are more expensive to prepare than many other antistatic agents presently existing in the prior art.

In German Pat. No. 2,318,308 there is disclosed an antistatic agent for polyamide fibers which is a polyoxyalkylated amino acid. These compositions can contain monovalent groups of the formula:

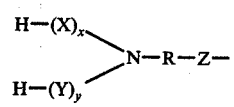

in which X and Y are oxyalkylene units, R is an aliphatic, aromatic or cycloaliphatic group, Z is —COO— residue, —SO$_2$O— residue or the metal salt, $x$ is 1 to 1,500 and $y$ is 0 to 1,500. These materials attempt to combine the increased conductivity of polyoxyalkylated compounds with the polarizing effects of amine, carboxylate, sulfonate or other salt groups. While these materials can be of high molecular weight, such materials differ from the antistatic agent polyester compositions of the invention which contain repeating amino and sulfonate salt groupings along the polymer chain, thus making it possible to incorporate a greater proportion of amino and sulfonate groups in the molecular structure and obtain the advantages attendant thereon.

Generally, antistatic agents are incorporated in plastic materials, especially fibers, by processes wich either involve impregnating the synthetic polymer fiber, for instance, a polyamide fiber subsequent to its being woven into a fabric or alternately by incorporating the antistatic agent into the polymer melt prior to spinning into filaments. Fibers extruded from such a melt are believed to contain the additive as an insoluble phase in the form of fine fibrils aligned with an dispersed throughout the fiber. Desirable fiber properties are generally not altered by the use of minor amounts of such additives, however, a substantial reduction in their tendency to acquire a static charge can result by the incorporation of an antistatic agent therein.

SUMMARY OF THE INVENTION

The purpose of the present invention is to provide (1) novel polyester antistatic agents for polymeric shaped objects especially textile fibers, (2) novel polyesters having improved antistatic properties, (3) a process for the production of said agents, (4) a process for the production of antistatic shaped objects such as synthetic fibers, and (5) a process for the production of N,N-bis(-hydroxyalkyl) taurine salts. The polyester antistatic agents can be incorporated into, for instance, a polypropylene fiber prior to melt-spinning into fibers. It has been found tht the incorporation of both amino and sulfonate groups along the backbone of an oligomeric polyester antistatic agent provides a desirable balance of properties such that satisfactory antistatic properties are obtained upon incorporation of said agent in a polymeric shaped object.

DETAILED DESCRIPTION OF THE INVENTION

The amphoteric amino sulfonate salt reactants of the invention are known from U.S. Pat. No. 2,830,082 as previously indicated. However, it has now been discovered that a more economical process for the preparation of such amphoteric amino sulfonate salts can be utilized to prepare such compounds rather than the prior art route of preparation from an alkali metal salt of taurine or N-methyltaurine with a 1,2- or 2-3-alkylene oxide having 2 to 4 carbon atoms.

The novel process of the invention for the preparation of amphoteric amino sulfonate salts (N,N-bis(hydroxyalkyl) taurine salts) comprises the reaction of excess dialkanolamine with an alkali metal or alkaline earth metal salt of a hydroxyalkylsulfonic acid corresponding to the general formula:

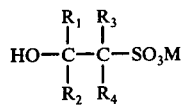

wherein $R_1$, $R_2$, $R_3$, and $R_4$ can be the same or different hydrocarbon radical selected from the group consisting of aliphatic hydrocarbons having about 2 to about 12 carbon atoms and M is an alkali metal or an alkaline earth metal derived cation. Representative hydroxyalkylsulfonic acids from which these salts are prepared by known methods are as follows:

2-hydroxyethanesulfonic acid (isethionic acid),
2-hydroxy-1-propanesulfonic acid,
1-hydroxy-2-propanesulfonic acid,
2-hydroxy-1-butanesulfonic acid,
1-hydroxy-2-butanesulfonic acid,
3-hydroxy-2-butanesulfonic acid,
1-hydroxy-2-methyl-2-propanesulfonic acid,
2-hydroxy-2-methyl-1-propanesulfonic acid,
1-hydroxy-3-methoxy-2-propanesulfonic acid,
2-hydroxy-3-methoxy-1-propanesulfonic acid,
1-hydroxy-2-octanesulfonic acid,
1-hydroxy-2-dodecanesulfonic acid,
1-hydroxy-2-hexanedecanesulfonic acid,
2-hydroxycyclohexanesulfonic acid.

The hydroxyalkylsulfonic acids listed above are used in the form of their alkali metal or alkaline earth metal salts such as the sodium, potassium, calcium, magnesium, etc. These salts are readily prepared by neutralization of the hydroxysulfonic acid with an equivalent amount of an alkali metal or alkaline earth metal hydroxide or carbonate.

The amphoteric amino sulfonate salt reactants are prepared by reacting at least 1 mole of a hydroxyalkylsulfonic acid metal salt with 2 or more moles of a dialkanolamine in the presence of a catalytic amount of a strong base at a temperature of about 180° C. to about 200° C. The water of condensation is removed during the process so that there is obtained upon completion of the reaction the desired amphoteric amino sulfonate salt. This is further reacted with an organic polycarboxylic acid to produce the polyester antistatic agents of the invention. Suitable strong base catalysts are the alkali metal hydroxides and carbonates illustrated by sodium hydroxide, potassium hydroxide, lithium hydroxide, sodium carbonate, and potassium carbonate. The alkaline earth metal hydroxides and carbonates and the alkali metal alkoxides having 1 to about 4 carbon atoms are also useful. Representative examples are sodium methoxide, potassium methoxide and magnesium and calcium hyroxides, magnesium and calcium carbonates.

The dialkanolamines have the structural formula:

HN(CH$_2$CHROH)$_2$ wherein R is a hydrogen atom or an alkyl radical having 0 to 21 carbon atoms. Non-limiting examples of the dialkanolamines are:

diethanolamine, dipropanolamine, diisopropanolamine,
2,2'-iminodibutanol-1, 3,3'-iminodibutanol-1,
4,4'-iminodibutanol-1, di-tertiary-butanolamine, and
3,3'-iminodipentanol-1, 6,6'-iminodihexanol-1.

Such dialkanolamines can be prepared by several methods well known to those skilled in the art. One method is by the direction addition reaction between ammonia and an epoxy compound such as ethylene oxide or propylene oxide. Another less direct process involves the reaction between ammonia and a halogenated alcohol such as 2-chlorobutanol-1.

The polyester of the invention comprises the reaction product of a substantially equivalent amount of a polycarboxylic acid or mixtures thereof with an amino amphoteric sulfonate salt (N,N-bis(hydroxyalkyl) taurine salt) having the generalized formula:

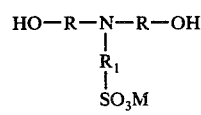

wherein R and $R_1$ are alkyl and individually selected from alkyl groups having about 2 to about 8 carbon atoms, and M is a metal selected from the group consisting of an alkali metal, an alkaline earth metal and mixtures thereof.

In the preparation of the polyester antistatic agent of the invention, the amphoteric amino sulfonate salt reactant prepared is further reacted with an organic polycarboxylic acid treatment. Said reactant is defined as any aliphatic, cycloaliphatic or aromatic polycarboxylic acid anhydride, ester and acid halide or mixtures thereof. Examples of such acids are phthalic, terephthalic, isophthalic, trimellitic, pyromellitic, oxalic, malonic, succinic, glutaric, adipic, pimelic, suberic, azelaic, sebacic, maleic, and fumaric acids. Also useful are 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, diglycolic, thiodipropionic, and 2,5-naphthalene dicarboxylic acids. Suitable mixtures of these polycarboxylic acids can be utilized to obtain optimal physical properties in the polyester composition of the invention as is well known by those skilled in the art. The corresponding acid anhydrides, esters and acid halides, i.e., acid chlorides of the above enumerated polycarboxylic acids can also be used.

The novel polyester of the invention is uniformly dispersed into shaped polymer such as a fiber-forming polymer and spun into fiber by methods well known in the art to produce an antistatic fiber. Generally, the novel polyester is incorporated into a shaped polymer fiber in the proportins of from about 1 to about 15%, preferably about 3 to about 10% by weight.

Generally, the polyester antistatic agent is added to the polymerization reactor at elevated temperature under an inert atmosphere during the last 30 minutes of the polymerization of the polyamide or other polymer which is desired to be rendered antistatic. The agent is thoroughly mixed into the polymer with stirring. The mixture is then extruded in the desired form, cooled, washed and dried.

The following examples will further illustrate the nature and method for preparing the polyester antistatic agents of the invention and for treating synthetic fiber-forming polymeric materials therewith. These examples, however, are not to be considered as limiting the invention. In the specification, claims and the examples which follow all proportions are by weight and all temperatures are in degrees centigrade unless otherwise noted.

EXAMPLE 1

An amphoteric amino sulfonate salt was prepared as follows:

Into a two-liter, three-necked flask equipped with a mechanical stirrer, thermometer, thermometer well and a vacuum distillation take-off there was charged 470 grams of 97% ethanolamine, 331 grams of isethionic acid, sodium salt (2-hydroxyethanesulfonic acid sodium salt) and 1.5 grams of sodium hydroxide. The resulting slurry was warmed to 60° C. and briefly placed under a pressure less than or equal to 5 millimeters of mercury. The vacuum was relieved with nitrogen in order to deoxygenate the mixture and the entire reaction was conducted under a nitrogen blanket. The flask was heated so as to evolve water, the evolution of water beginning at 180° C. The temperature was slowly increased over a period of 8 hours to a temperature of 195° C. to facilitate removal of water. The theoretical amount of water of condensation (36 grams) had been collected after a period of 8 hours. The mixture was then cooled to 165° C. and the above vacuum established. Rapid removal of diethanolamine occurred at a temperature of 139° C. and at a pressure of 0.1 millimeter of mercury. At a pot temperature of 165° C., a total of 236 grams of diethanolamine was removed. In order to distill out the remainder of the diethanolamine, the pot temperature was increased to 180° C. Another 47 grams of distillate was obtained bringing the total of unreacted diethanolamine to 258 grams. The product had a hydroxyl number of 469 and 6.3% nitrogen. This compares with a calculated theoretical value of 479 for hydroxyl number and 5.8 for percent nitrogen.

EXAMPLE 2

The antistatic agent polyester of the invention was prepared using the amphoteric amino sulfonate salt prepared in Example 1 by the following procedure:

A 500-milliliter, three-necked flask equipped with a mechanical stirrer, thermometer and complete with a vacuum distillation take-off consisting of a Claisen head with thermometer, condenser, vacuum adaptor and receiving flask was charged with 334 grams of a 66% aqueous solution of the amphoteric amino sulfonate salt prepared in Example 1. To this flask there was then added 143 grams of azelaic acid. The mixture was distilled under reduced pressure to remove water. After one hour all the water had been removed and the temperature was increased until water of condensation appeared. At a temperature of 140° C. to 160° C. and a pressure of 0.5 millimeter of mercury, rapid evolution of water of condensation was noted by vigorous bubbling and condensation of water in the condenser and receiving flask. After a reaction time of 3 hours, the homogeneous, viscous and transparent reaction product was discharged from the flask, and on cooling solidified into a hard and brittle resin. The product had an OH number of 44 and an acid number of 57.

EXAMPLE 3

The procedure of Example 2 was repeated except that sebacic acid instead of azelaic acid was utilized to produce an antistatic agent polyester having an OH number of 6.4 and an acid number of 79.

EXAMPLE 4

The reaction procedure of Example 2 was repeated using adipic acid instead of the azelaic acid used in Example 2 to produce a polyester having a hydroxyl number of 22 and a acid number of 70.

EXAMPLES 7 and 8

Resistivity determinations in accordance with ASTM D-257 test method were made using a Keithly electrometer and static detector. Polyamide films containing the polyester antistatic agent of the invention were prepared by dissolving the polyamide (sold under the trademark "Nylon6") and the polyester in trifluoroethanol and casting film samples therefrom containing five percent and ten percent of the polyester antistatic agent of the invention. Resistivity determinations were made under controlled temperature and humidity and results obtained at 25° C. at 10, 20 and 30 percent relative humidity. Results are shown in Table I.

Table I

| | RESISTIVITY OF POLYAMIDE FILM CONTAINING THE ANTISTATIC AGENT OF THE INVENTION | | | |
|---|---|---|---|---|
| | % Antistatic | Resistivity, $Log_{10}$ Relative Humidity (%) | | |
| Example | Agent | 10 | 20 | 30 |
| 7 | 5 | 14.8 | 14.0 | 12.9 |
| 8 | 10 | 13.9 | 13.0 | 12.2 |
| Control | 0 | 14.3 | 13.7 | 13.2 |

EXAMPLE 9

The polyester antistatic agent of the invention prepared in Example 2 was used to prepare an antistatic polypropylene fiber by incorporation of about one percent by weight thereof in a polypropylene polymer prior to extrusion into filaments. Samples of polypropylene were extruded both with and without the polyester prepared in Example 2 using a CSI Max-Mixing Extruder. Samples of fiber obtained were conditioned at 10, 20 and 30 percent relative humidity at 25° C. and then surface resistivity was measured as described in Examples 7 and 8. All samples were conditioned for 72 hours at 10 percent relative humidity at 25° C. Those to be tested at this condition are evaluated and the remainder of the samples are further conditioned at 20 percent relative humidity for 24 hours. Samples to be evaluated at 30 percent relative humidity are further conditioned at this condition for 24 hours prior to testing. Results are shown in Table II.

Table II

| | RESISTIVITY OF POLYPROPYLENE FIBER CONTAINING THE ANTISTATIC AGENT OF THE INVENTION | | | |
|---|---|---|---|---|
| | % Antistatic | Resistivity, $Log_{10}$ Relative Humidity (%) | | |
| Example | Agent | 10 | 20 | 30 |
| 9 | 1 | 13.7 | 13.6 | 12.2 |
| Control | 0 | 14.4 | 14.6 | 14.6 |

While this invention has been described with reference to certain specific embodiments, it will be recognized by those skilled in the art that many variations are possible without departing from the scope and spirit of the invention.

The embodiments of the invention in which an exclusive property or privilege is claimed are defined as follows:

1. A polyester having both amino and sulfonate groups along the backbone of said polyester comprising the reaction product of a polycarboxylic acid reactant selected from the group consisting of aliphatic, cycloaliphatic and aromatic polycarboxylic acids, anhydrides, esters and acid halides and mixtures thereof with an N,N-bis(hydroxyalkyl) taurine metal salt having the formula:

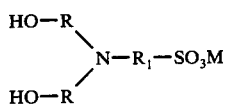

wherein R and $R_1$ are alkyl and individually selected from alkyl groups having about 2 to about 8 carbon atoms and M is a metal selected from the group consisting of alkali metals, alkaline earth metals and mixtures thereof.

2. The composition of claim 1 wherein R and $R_1$ are ethyl.

3. The composition of claim 2 wherein said polycarboxylic acid is selected from the group consisting of azelaic acid, sebacic acid, adipic acid and the mixtures thereof.

4. The composition of claim 3 wherein said polycarboxylic acid is azelaic acid and M is sodium.

5. A process for producing a polyester useful as an antistatic additive for polymeric shaped objects including fibers comprising the steps of:

A. preparing a salt of N,N-bis(hydroxyalkyl) taurine having the formula:

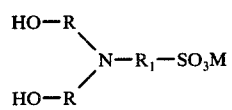

wherein R and $R_1$ are alkyl and individually selected from alkyl groups having about 2 to about 8 carbon atoms and M is a metal selected from the group consisting of alkali metals, alkaline earth metals and mixtures thereof by reacting 2 or more moles of a dialkanolamine wherein the alkyl groups have about 2 to about 8 carbon atoms with at least 1 mole of a hydroxyalkylsulfonic acid metal salt, removing the water of condensation and excess dialkanolamine under reduced pressure and recovering a product having the formula of said metal salt and B. reacting said metal salt with a polycarboxylic acid reactant to obtain said polyester.

6. The process of claim 5 wherein said hydroxyalkylsulfonic acid metal salt is selected from the group consisting of the alkali or alkaline earth metal salts of 2-hydroxyethanesulfonic acid.

7. The process of claim 5 wherein said polycarboxylic acid reactant is selected from the group consisting of aliphatic, aromatic, cycloaliphatic dicarboxylic acids and mixtures thereof.

8. The process of claim 7 wherein said polycarboxylic acid reactant is an aliphatic dicarboxylic acid.

9. The process of claim 8 wherein said aliphatic dicarboxylic acid is azelaic acid.

10. The process of claim 9 wherein said dialkanolamine is diethanolamine.

11. The process of claim 10 wherein said 2-hydroxyethanesulfonic acid metal salt is the sodium salt.